US011126799B2

(12) United States Patent
Brandall et al.

(10) Patent No.: US 11,126,799 B2
(45) Date of Patent: Sep. 21, 2021

(54) DYNAMICALLY ADJUSTING TEXT STRINGS BASED ON MACHINE TRANSLATION FEEDBACK

(71) Applicant: Netflix, Inc., Los Gatos, CA (US)

(72) Inventors: Tim Brandall, San Jose, CA (US); Shawn Xu, Los Altos, CA (US)

(73) Assignee: Netflix, Inc., Los Gatos, CA (US)

( * ) Notice: Subject to any disclaimer, the term of this patent is extended or adjusted under 35 U.S.C. 154(b) by 174 days.

(21) Appl. No.: 16/289,999

(22) Filed: Mar. 1, 2019

(65) Prior Publication Data

US 2020/0279021 A1     Sep. 3, 2020

Related U.S. Application Data

(60) Provisional application No. 62/729,912, filed on Sep. 11, 2018.

(51) Int. Cl.
*G06F 40/58* (2020.01)
(52) U.S. Cl.
CPC .................................. *G06F 40/58* (2020.01)
(58) Field of Classification Search
USPC ........................................................ 704/3–6
See application file for complete search history.

(56) References Cited

U.S. PATENT DOCUMENTS

| | | | |
|---|---|---|---|
| 6,024,571 A * | 2/2000 | Renegar ................. | G09B 19/00 434/157 |
| 7,865,353 B2 * | 1/2011 | Koyama ................. | G06F 40/58 704/3 |
| 8,135,574 B2 * | 3/2012 | Weikel ................... | G06F 40/45 704/3 |
| 8,170,862 B2 * | 5/2012 | Konno .................... | G06F 40/58 704/3 |
| 8,913,188 B2 * | 12/2014 | Ayoub ............... | H04N 5/44513 348/468 |
| 9,639,528 B1 | 5/2017 | Hoffmann et al. | |

(Continued)

OTHER PUBLICATIONS

International Search Report and Written Opinion received for PCT Application Serial No. PCT/US2019/044740 dated Nov. 5, 2019, 15 pages.

*Primary Examiner* — Leonard Saint Cyr
(74) *Attorney, Agent, or Firm* — FisherBroyles, LLP

(57) ABSTRACT

The disclosed computer-implemented method may include accessing a string of text that includes characters written in a first language. The method may next include translating the text string into different languages using machine translation. The method may next include identifying, among the translated text strings, a shortest string and a longest string. The method may also include calculating a customized string length adjustment ratio for adjusting the length of the accessed text string based on the shortest translated string length and the longest translated string length. Furthermore, the method may include dynamically applying the calculated customized string length adjustment ratio to the accessed text string, so that the length of the accessed text string may be dynamically adjusted according to the customized string length adjustment ratio. The method may also include presenting the adjusted text string in the user interface. Various other methods, systems, and computer-readable media are also disclosed.

20 Claims, 10 Drawing Sheets

(56) References Cited

U.S. PATENT DOCUMENTS

| | | |
|---|---|---|
| 2006/0161836 A1 | 7/2006 | Thomson et al. |
| 2006/0217954 A1* | 9/2006 | Koyama ................. G06F 40/58 704/2 |
| 2007/0143662 A1* | 6/2007 | Carlson ................... G06F 9/451 715/207 |
| 2008/0059877 A1 | 3/2008 | Brookler et al. |
| 2009/0132234 A1* | 5/2009 | Weikel .................... G06F 40/45 704/3 |
| 2011/0320938 A1 | 12/2011 | Schorsch |
| 2013/0138421 A1 | 5/2013 | Moulder |
| 2016/0048307 A1 | 2/2016 | Troyer et al. |

\* cited by examiner

FIG. 3

301 → The account name or password is incorrect. Please try again.

302 — Machine Translation

| | |
|---|---|
| ar | اسم الحساب أو كلمة المرور غير صحيحين. يرجى إعادة المحاولة. |
| bg | Името или паролата за акаунта са неправилни. Опитайте отново. |
| da | Kontonavnet eller adgangskoden er ikke korrekt. Prøv igen. |
| de | Der Kontoname oder das Passwort stimmen nicht. Bitte versuchen Sie es noch einmal. |
| el | Το όνομα του λογαριασμού ή ο κωδικός πρόσβασης είναι εσφαλμένα. Προσπαθήστε ξανά. |
| en | The account name or password is incorrect. Please try again |
| en-XA | [Ṫheé aḉċoöüñṫ ñaṁeé oŕ paášswöírd iš iñcoöŕeéçt. Pĺeéaášeé ṫry aǧaäíiñ] |
| es | El nombre de la cuenta o la contraseña no son correctos. Intenta de nuevo. |
| es-ES | El nombre de cuenta o la contraseña no son correctos. Vuelve a intentarlo. |
| fi | Tilin nimi tai salasana on väärä. Yritä uudelleen. |
| fr | Le nom de compte ou le mot de passe est incorrect. Veuillez réessayer. |
| fr-CA | Le nom de compte ou le mot de passe est incorrect. Veuillez réessayer. |
| he | שם החשבון או הסיסמה שגויים. נסה שוב. |
| it | Nome o password dell'account errati. Riprova. |
| ja | アカウント名またはパスワードが間違っています。もう一度お試しください。 |
| ko | 아이디나 비밀번호를 잘못 입력하셨습니다. 다시 시도해 주세요. |
| nb | Kontonavn eller passord er feil. Prøv på nytt. |
| nl | De accountnaam of het wachtwoord is niet juist. Probeer het opnieuw. |
| pl | Nieprawidłowa nazwa konta lub hasło. Spróbuj ponownie. |
| pt | O nome da conta ou senha está incorreto. Tente novamente. |
| pt-PT | A palavra-passe ou o nome da conta não está correto. Tente novamente. |
| ro | Numele de utilizator sau parola este incorectă. Te rugăm să încerci din nou. |
| sv | Kontonamnet eller lösenordet är felaktigt. Försök igen. |
| th | ชื่อบัญชีหรือรหัสผ่านไม่ถูกต้อง โปรดลองอีกครั้ง |
| tr | Girilen hesap adı veya parola yanlış. Lütfen yeniden deneyin |
| zh-CN | 帐户名称或密码有误。请重试。 |
| zh-TW | 帳戶名稱或密碼不正確。請再試一次。 |

303, 304, 305, 306

The account name or password is incorrect. Please try again.

[Theé aåçcoöuúñt ñaåmeé →őŕ paåšẃoőŕd iš iñ̌coőŕreéçt. P↑ eéaåšeé ṭrý aåğaåiñ̌.]

→ = Shortest machine translation length

↑ = Length of the original English string

FIG. 5

The account name or password is incorrect. Please try again.
— 601

[Tthhé åççöüññtt ↓örŕ ppååššŵŵörŕdd íšš íññccörŕéççtt. Ppĺĺéåššé ţţrŷŷ åġġåíññ.]
— 602  — 603
— 604

↓ = Shortest machine translation length

← = Length of the original English string

FIG. 6

| | String with ICU Plural Format, Variable, and HTML Tags |
|---|---|
| Input 801 | {numDays, plural, one {TV shows and movies added in the last <b>day</b>.} other {TV shows and movies added in the last <b>{numDays} days</b>.}} |
| Output 802 | [{numDays, plural, one {TV šhoõws aåñd mǫöviieeŝ aåðdeeð iiñtheé ļaåšt <b>ðaåy</b>.} other {TV šhoôws aåñ d mǫöviieeŝ aåðdeé ð iiñtheé ļaåšt <b>{numDays} ðaåýs</b>.}}] |

FIG. 8

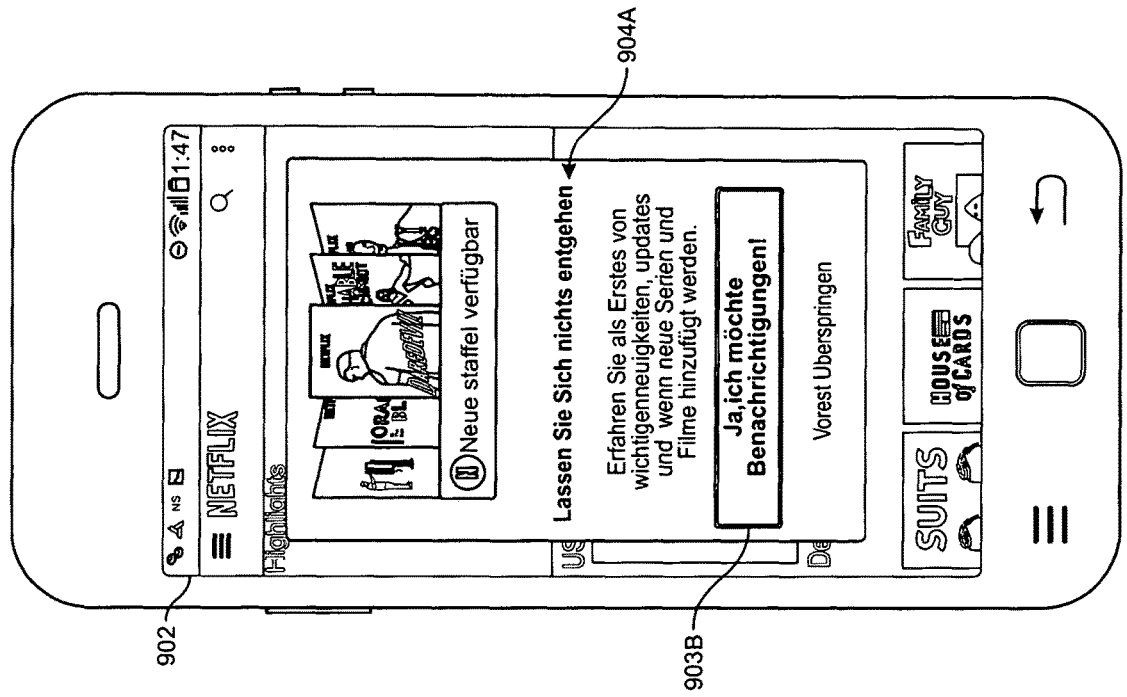
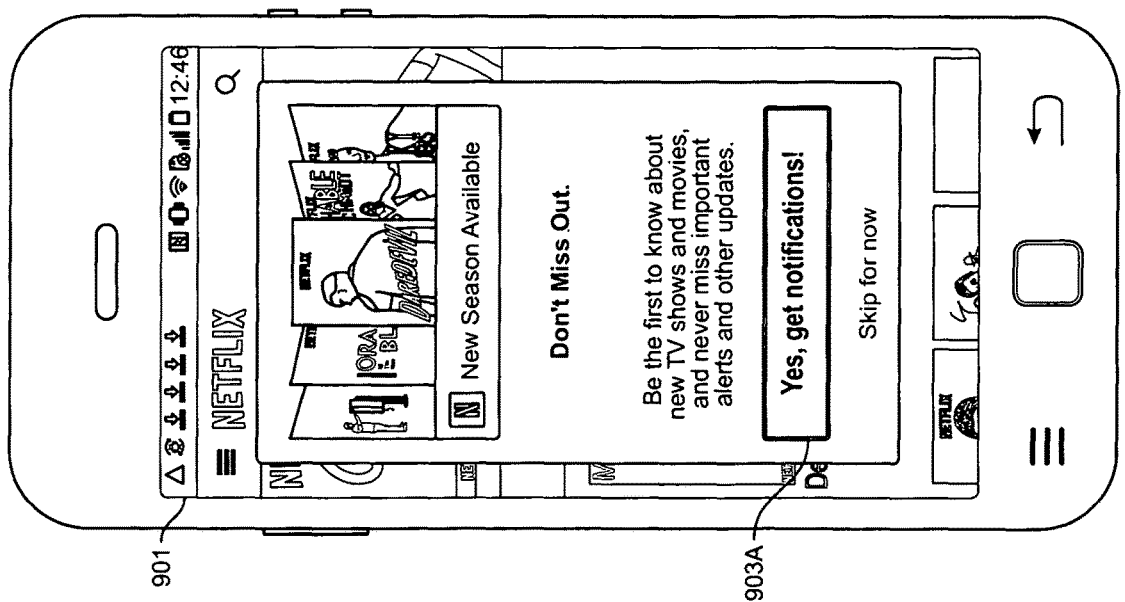
FIG. 9A

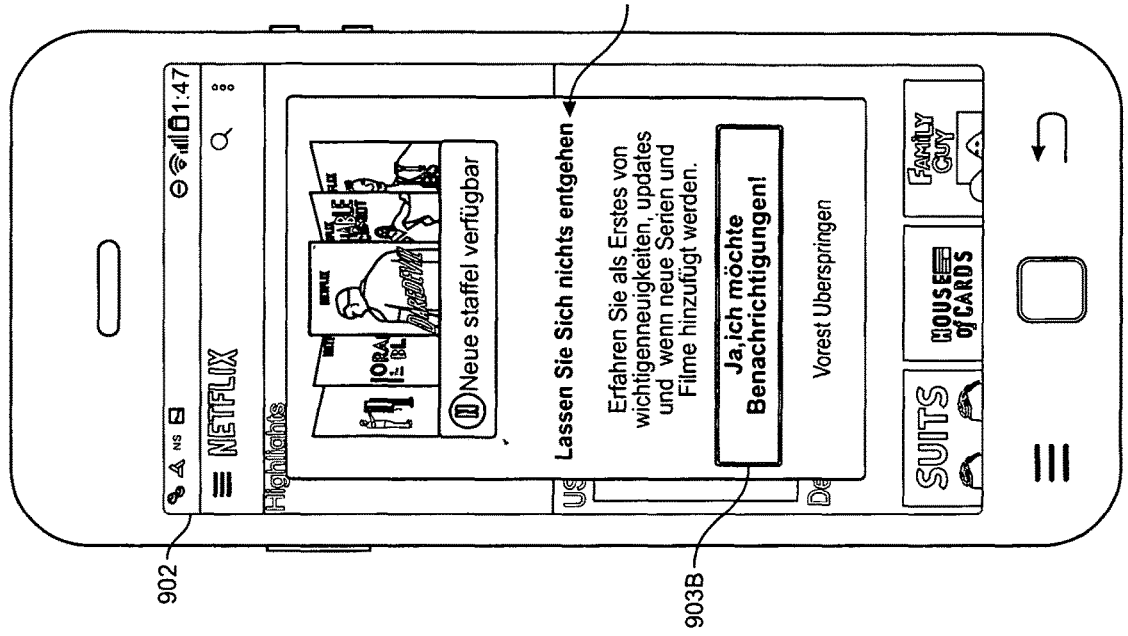
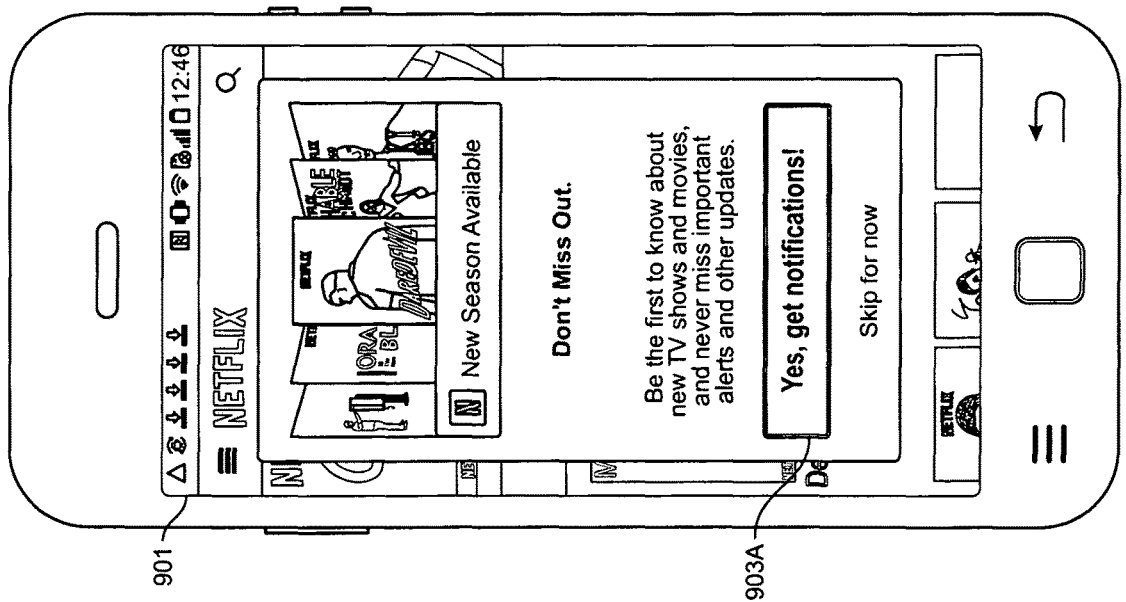
FIG. 9B

DYNAMICALLY ADJUSTING TEXT STRINGS BASED ON MACHINE TRANSLATION FEEDBACK

CROSS-REFERENCE TO RELATED APPLICATION

This application claims the benefit of priority under 35 U.S.C. § 119(e) of U.S. Provisional Patent Application No. 62/729,912, filed on Sep. 11, 2018, the contents of which are incorporated herein by reference in their entirety.

BACKGROUND

User interfaces allow users to interact with software-based applications. These user interfaces typically include interface elements such as windows, menus, buttons, links, text input boxes, or other elements that allow users to interact with the underlying software application. Many software applications are developed and produced for a world-wide audience. As such, the text associated with the user interface elements is often translated into different languages to accommodate users who speak those languages. Many times, during translation, text strings that fit within a given text box or other user interface element no longer fit within that element in the translated language.

Accordingly, software application user interface developers often add extra space within the user interface elements (typically 30% extra space) to allow for expansion during translation. However, applying a static expansion rate does not typically work well for all languages or for all user interface elements. For instance, in some cases, a translated text string may actually be smaller than the original text or may be larger than a 30% expansion would provide. As such, applying a static expansion ratio may lead to additional user interface problems when providing the user interface in other languages.

SUMMARY

As will be described in greater detail below, the instant disclosure describes methods and systems that dynamically adjust string length in a user interface according to a customized string length adjustment ratio generated specifically for that string in a target language into which the string is to be translated.

In one example, a computer-implemented method for dynamically adjusting string length in a user interface according to a customized string length adjustment ratio may include accessing a string of text that includes characters written in a first language. The method may next include translating the accessed text string into different languages using machine translation. The method may further include identifying, among the translated text strings, a shortest string having the shortest translated string length and a longest string having the longest translated string length. The method may also include calculating a customized string length adjustment ratio for adjusting the length of the accessed text string based on the identified shortest translated string length and the identified longest translated string length. Still further, the method may include dynamically applying the calculated customized string length adjustment ratio to the accessed text string, so that the length of the accessed text string may be dynamically adjusted according to the customized string length adjustment ratio. The method may then include presenting the adjusted text string in the user interface.

In some examples, the customized string length adjustment ratio may be calculated and applied dynamically as the string of text is input by a user. In some examples, presenting the adjusted text string in the user interface may further include determining which characters in the accessed text string are vowels and may add additional vowels at each identified vowel in the adjusted text string. In some examples, a sufficient number of additional vowels may be added to the adjusted text string to expand the adjusted text string according to the customized string length adjustment ratio.

In some examples, presenting the adjusted text string in the user interface may further include adding additional words to the adjusted text string to expand the adjusted text string according to the customized string length adjustment ratio. In some examples, presenting the adjusted text string in the user interface may further include removing words or characters from the adjusted text string to contract the adjusted text string according to the customized string length adjustment ratio.

In some examples, presenting the adjusted text string in the user interface may further include adding additional spaces between characters of the adjusted text string to expand the adjusted text string according to the customized string length adjustment ratio.

In some examples, the method may further include receiving an input indicating a specified second language into which the accessed text string is to be translated, translating the accessed text string into the second language using machine translation, and presenting the adjusted text string in the second language in the user interface, allowing the user interface to be verified in the second language.

In some examples, a user developing various aspects of the user interface may implement the customized string length adjustment while developing the user interface. In some examples, the user may see, for each user interface feature, whether that user interface feature is properly presented in a specified language. In some examples, the customized string length adjustment ratio may be applied dynamically as a user is providing text for user interface elements.

In addition, a corresponding system for dynamically adjusting string length in a user interface according to a customized string length adjustment ratio may include several modules stored in memory, including a string accessing module configured to access a string of text that includes characters written in a first language. The system may also include a machine translator configured to translate the accessed text string into different languages using machine translation. The system may further include a string length identifying module configured to identify, among the translated text strings, a shortest string having the shortest translated string length and a longest string having the longest translated string length. Still further, the system may include a string adjustment calculator configured to calculate a customized string length adjustment ratio for adjusting the length of the accessed text string based on the identified shortest translated string length and the identified longest translated string length. The system may also include a string adjustment module configured to dynamically apply the calculated customized string length adjustment ratio to the accessed text string, so that the length of the accessed text string is dynamically adjusted according to the customized string length adjustment ratio. The system may also include a presentation module configured to present the adjusted text string in the user interface.

In some examples, the adjusted text string may include boundary markers visible within the user interface. In some examples, the system may further scan user interface screenshots for the boundary markers to automatically detect clipping of the adjusted text string. In some examples, the system may insert intermediate markers into the adjusted text string indicating the identified shortest string, the identified longest string, the first language text string or the length recommended by the customized string length adjustment ratio.

In some examples, diacritics may be added to characters of the adjusted text string to provide a vertical stress to the user interface. In some examples, the system may take a screenshot of the user interface for a software build of the user interface and submit the screenshot to a quality assurance user to validate the software build.

In some examples, the customized string length adjustment ratio may be specific to the first language. In some examples, accessing the string of text that includes characters written in a first language may include highlighting the string of text and changing to a specified font, so that the font applies the customized string length adjustment ratio to the accessed text string.

In some examples, the above-described method may be encoded as computer-readable instructions on a computer-readable medium. For example, a computer-readable medium may include one or more computer-executable instructions that, when executed by at least one processor of a computing device, may cause the computing device to access a string of text that includes characters written in a first language, translate the accessed text string into different languages using machine translation, identify, among the translated text strings, a shortest string having the shortest translated string length and a longest string having the longest translated string length, calculate a customized string length adjustment ratio for adjusting the length of the accessed text string based on the identified shortest translated string length and the identified longest translated string length, dynamically apply the calculated customized string length adjustment ratio to the accessed text string, so that the length of the accessed text string is dynamically adjusted according to the customized string length adjustment ratio, and present the adjusted text string in the user interface.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 illustrates an embodiment in which shortest and longest translated string lengths are calculated.

FIG. 5 illustrates an embodiment in which markers indicating shortest and longest translated strings are inserted.

FIG. 6 illustrates an alternative embodiment in which markers indicating shortest and longest translated strings are inserted.

FIG. 8 illustrates an embodiment in which underlying markup language is implemented to present text that has been adjusted using a customized string length adjustment ratio.

FIG. 9A illustrates an embodiment of a user interface in which text is clipped in at least one location.

FIG. 9B illustrates an embodiment of the user interface in which the text is no longer clipped.

Figure 1:
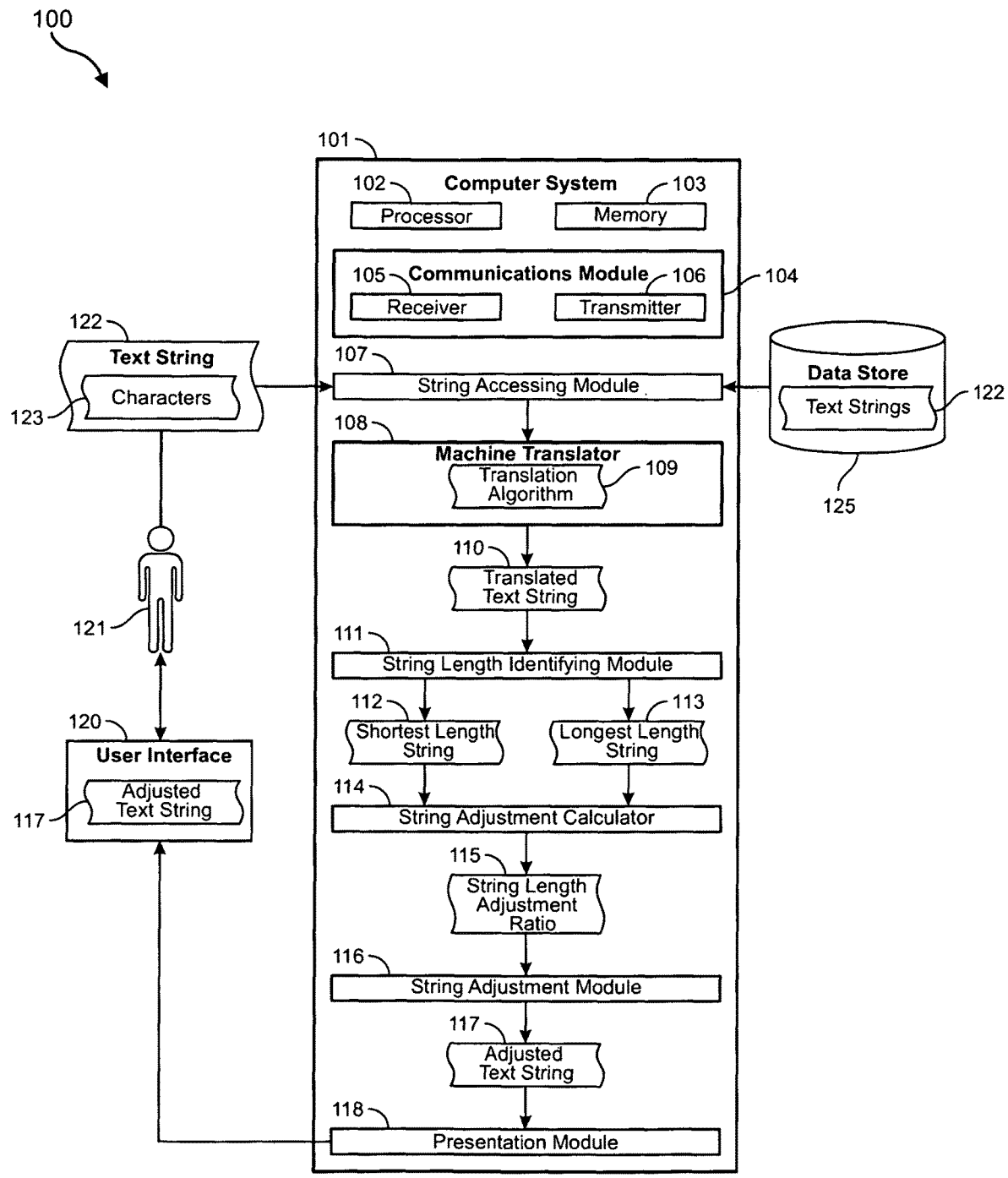
FIG. 1 illustrates a computing environment in which embodiments described herein may be implemented.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to dynamically adjusting text string length in a user interface according to a customized string length adjustment ratio. As noted above, user interfaces and their constituent elements are often translated into different languages. For example, in a user interface for a mobile phone, various buttons, menus or other elements may be translated from a base language to a new language. In some cases, the translated text in the new language may be longer or shorter than in the base language. In traditional systems, a software developer working on a user interface would typically create the user interface in a base language (e.g., English) and then add a 30% static expansion ratio to leave room for translation into other languages that typically use more words or use longer words to convey the same meaning.

For example, German and Greek phrases often take much more space than English phrases that convey the same meaning. Other languages such as Thai or Chinese may take up a much smaller space to convey the intended meaning of a word or phrase. Accordingly, words or phrases input by the developer may look very different in the user interface once those words or phrases are translated. This may lead to many different problems including text that is clipped or abbreviated, text that appears too large or too small for a given user interface element, text covers a graphic or image, or text that simply looks unprofessional in a professionally produced interface. At least some of these problems may be avoided by using the embodiments described herein.

In one embodiment, for example, a method or system may be designed to calculate a customized string length for any given element in a user interface using a customized string length adjustment ratio. The customized string length adjustment ratio may analyze translated text information from a variety of different languages to determine how best to adjust the base text written in the original language. Then, instead of finalizing a software build in that base language and sending it off for human translation, the user interface developer can look at how the text will likely be expanded or contracted in the translated languages in real-time, as the developer is working on the user interface.

For example, in one embodiment of the present disclosure, a software developer or other user (e.g., an amateur content creator) can enter a word or phrase of text while designing the user interface. Then, in the background, the systems herein may access the word or phrase, provide that text string to a machine translator and then determine among multiple different translated text strings, which language resulted in the shortest translation and which language resulted in the longest translation. Thereafter, the system may use the shortest and longest translations to calculate a customized text string adjustment ratio. If the base language is a language that tends to longer translations, for example, the text string length may be reduced in length. If the base language is a language that tends to shorter translations, the text string may be extended.

Expansion and contraction may happen in a variety of ways including adding or removing spaces, adding or removing vowels, adding or removing consonants, adding or removing special characters, or adding or removing other characters that add space to or remove space from the original text string. This expansion or contraction may occur dynamically as the developer is applying text in the user interface (e.g., after each word or phrase is input by the developer). Accordingly, the developer may be able to see accurate picture of how the size of the text string would look in the user interface in a variety of different languages. Using this information, the developer (or other user) can make changes to the text string or make changes to the user interface to better accommodate the provided text.

The following will describe, with reference to FIGS. 1-9B, detailed descriptions of various methods and systems for dynamically adjusting string length in a user interface according to a customized string length adjustment ratio. FIG. 1 illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may further include a string accessing module 107. The string accessing module 107 may be configured to access text strings such as text string 122. Text string 122 may include a single word, a phrase or a plurality of words and/or phrases. The text string 122 may be written in any base language and may include substantially any number of characters 123. The text string 122 may be received from a user 121, from a software application, from another entity, or from a local or distributed data store such as data store 125. Once the string accessing module 107 has accessed the text string, the string accessing module may provide the text string to the machine translator 108. The machine translator 108 may use one or more different machine translation algorithms 109 to translate the text string 122 from a first language into different languages. Indeed, the machine translator 108 may be configured to translate each string into substantially any number of different languages.

In some cases, the machine translation may occur automatically as each word is entered by a user. For example, if user 121 is a software developer or amateur content provider working on a user interface for a software application, the user may input words that are to be integrated into the user interface (e.g., as menu options or button labels or textual descriptions, etc.). As the user 121 inputs these words, the machine translator 108 may translate these words into one or more specified languages. In other cases, the machine translator may be configured to wait until a full word phrase or sentence is entered and then perform the translation. This feature may be configured in settings and may be adjusted by the user 121 as desired.

After the machine translation is complete, the translated text string 110 may be provided to the string length identifying module 111. The string length identifying module 111 may access each translated string and determine the length of that string. Thus, for example, if the text string 122 were to be translated into 25 different languages, the string length identifying module 111 may determine the length of each translated text string 110 and determine which has the shortest string length 112 and which has the longest string length 113. This determination may be made based on the number of characters in each translated text string 110 or based on how much space the characters take up when displayed on screen.

Once the shortest length string 112 and longest length string 113 have been identified, the string adjustment calculator 114 may calculate a string length adjustment ratio 115 that is customized for the text string 122. In some cases, the string length adjustment ratio 115 may be correlated directly to the length of the longest translated string 113. As such, the text string 122, when adjusted by this ratio, may be equal in length to the longest translated string 113. This would ensure that, regardless of which language is ultimately used for the user interface, each of the translated text strings would respectively fit in the assigned user interface element without resulting in clipping or other unsightly issues. In other cases, the string length adjustment ratio 115 may be based on a distance that is less than the full length of the longest translated string 113. Such may be useful if certain languages are to be omitted in the translations of the final software build, or if the developer is aiming for a solution that will work for most languages but potentially not all languages.

Once the string length adjustment ratio 115 has been determined for the text string 122, the string adjustment module 115 may adjust the text string 122 according to the string length adjustment ratio 115. The adjusting may include expanding the text string by adding extra characters (e.g., vowels, consonants, numbers, etc.), adding extra spaces, or adding other symbols or characters to the text string 122. Alternatively, the adjusting may include contracting the text string by removing characters (e.g., vowels, consonants, numbers, etc.), removing extra spaces, or removing other symbols or characters from the text string 122. Accordingly, the string adjustment module 116 may expand or contract the text string 122 in a variety of different ways according to the determined string length adjustment ratio 115.

Once the text string 122 has been adjusted according to the string length adjustment ratio 115, the presentation module 118 may present the adjusted text string 117 in the user interface 120. The user 121 may then see the word or phrase initially entered in the text string 122, but the text string may be expanded or contracted according to the string length adjustment ratio 115. These embodiments will be explained further below with regard to method 200 of FIG. 2.

Figure 2:
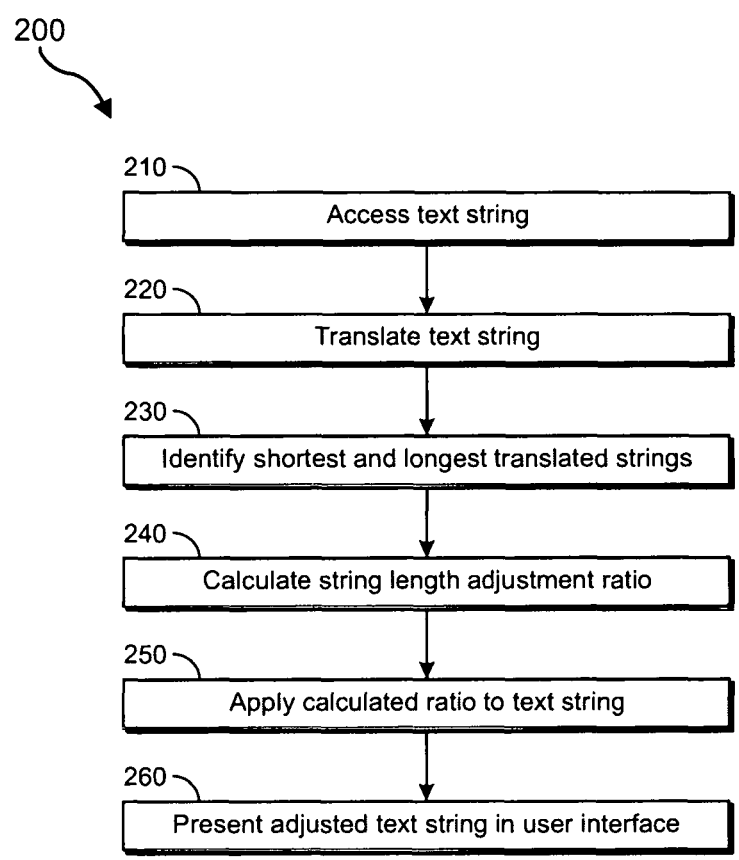
FIG. 2 illustrates a flow diagram of an exemplary method for adjusting string length in a user interface according to a customized string length adjustment ratio.

FIG. 2 is a flow diagram of an exemplary computer-implemented method 200 for dynamically adjusting string length in a user interface according to a customized string length adjustment ratio. The steps shown in FIG. 2 may be performed by any suitable computer-executable code and/or computing system, including computer system 101 illustrated in FIG. 1. In one example, each of the method steps shown in FIG. 2 may represent an algorithm whose structure includes and/or is represented by multiple sub-steps, examples of which will be provided in greater detail below.

As illustrated in FIG. 2, at step 210, one or more of the systems described herein may access a string of text that includes one or more characters written in a first language. For example, text string accessing module 107 may access text string 122. The string accessing module 107 may access text string 122 from a variety of sources including user 121 and/or data store 125. The string accessing module 107 may access the text string 122 one character at a time, one word at a time, one sentence at a time, one paragraph at a time, etc. Each word or phrase accessed by the string accessing module 107 may be translated into one or more different languages using machine translation at step 220.

For example, machine translator 108 may implement one or more translation algorithms 109 to translate the text string 122 into different languages. In most of the examples herein, English is used as the base language. However, it will be understood that any language may be the base language from which the translated text strings 110 are produced. FIG. 3, for example, illustrates one example of an English text string 301 that is machine translated 302 into multiple different languages. In FIG. 3, the phrase "The account name or password is incorrect. Please try again." is machine translated into 26 different languages from Arabic (ar) to Chinese (zh-TW). More or fewer languages may be used in any given implementation.

Once the text string 122 has been translated, the string length identifying module 111 of FIG. 1 may determine the translated string 110 with the shortest length. In this case, the shortest translated string Chinese (zh-CN). The longest translated string 113 is Greek (el), represented by line 305. Line 303 may represent the length of the English phrase, and line 304 may represent a static, percentage-based expansion (e.g., 30%). As can be seen, a static, percentage-based expansion would result in clipped text for German (de), Greek (el) and extended English (en-XA). Accordingly, by performing the machine translation, the systems herein may determine a worst-case scenario for each text string 122 and may plan ahead for it. Thus, for example, by changing the user interface to accommodate the longest translated string 113, the developer may be able to ensure that problems associated with an overly long translated text string may be avoided.

For instance, because the user 121 (e.g., a developer) knows how long the longest translated string will likely be (allowing for some variation between the machine-translated text and the finalized, human-translated text), he or she can design the user interface elements to accommodate the longest string length. Ultimately, in most cases, each string will likely be human-translated before the final user interface is compiled and released, which could potentially result in an even longer string length. As such, at least in some cases, the developer may add additional buffer space within the user interface element for a longer, human-translated string. In some cases, the developer may also plan for shorter translated strings. For example, if a Greek user was developing a user interface in Greek (typically one of the languages with the longest translated text strings), most or all of the translated text strings may come back from the machine translator 108 shorter than the original Greek text strings. Accordingly, in such cases, the string length adjustment ratio 115 may indicate that the text strings are to be contracted at least by some degree to better represent the majority of the translated languages.

Returning to method 200 of FIG. 2, at step 230, the string length identifying module 111 of FIG. 1 may identify, among the translated text strings 110, a shortest string 112 having the shortest translated string length and a longest string 113 having the longest translated string length. The string adjustment calculator 114 may then calculate, at step 240, a customized string length adjustment ratio 115 for adjusting the length of the accessed text string 122 based on the identified shortest translated string length 112 and the identified longest translated string length 113. The string adjustment module 116 may then dynamically apply, at step 250, the calculated customized string length adjustment ratio 115 to the accessed text string 122. As such, the length of the accessed text string 122 may be dynamically adjusted according to the customized string length adjustment ratio. The presentation module 118 may then present, at step 260, the adjusted text string 117 in the user interface 120.

Figure 4:
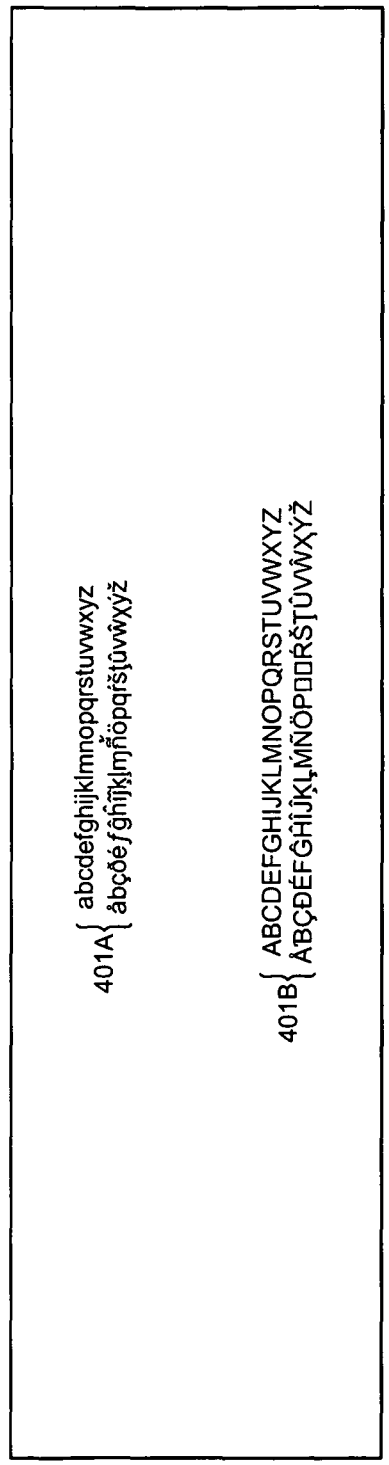
FIG. 4 illustrates various characters which may be used when designing a user interface.

The adjusted text string 117 may take a variety of different forms. As shown in FIG. 4, for example, the adjusted text string 117 may use a customized set of characters. In addition to standard English alphabet characters (or as an alternative thereto), a corresponding set of lower-case customized characters 401A may be implemented. An upper-case set of customized characters 401B may also be in the adjusted text string 117. The customized characters 401A/401B may include diacritics that appear above, below or within the traditional English alphabet characters. These diacritics include lines, curves, dots or other shapes that are embedded within or are appended to the English alphabet characters. These diacritics may serve to expand the adjusted text string 117, both vertically and horizontally. These customized characters may be implemented in user interface text strings including menus, headers, buttons, drop-down lists or other user interface elements. The customized characters 401A/401B may be used in addition to traditional English alphabet characters or as an alternative to traditional English alphabet characters.

For example, as shown in FIG. 5, the phrase "The account name or password is incorrect. Please try again." (501) may be input as text string 122 of FIG. 1. This text string 501 may be machine translated and the resulting translated text strings 110 may be analyzed for different string lengths. The text string 122 may then be adjusted according to the calculated string length adjustment ratio 115, as determined in the manner described above in method 200 of FIG. 2. The resulting adjusted string 117 may appear in the user interface 120 in a manner similar to that shown in FIG. 5. For example, the adjusted text string 502 may include one or more customized characters 401A/401B from FIG. 4. The adjusted text string 502 may also include extra characters to expand the text string. In adjusted text string 502, for instance, the string adjustment module 116 has added an extra vowel for each vowel present in the original text string 501. At least in some embodiments, adding an extra vowel for each vowel currently present may expand the text string sufficiently to meet the determined string length adjustment ratio 115.

In some cases, the adjusted text string 502 may include markers 503 and 504 that indicate the length of the shortest machine translation and the length of the original English string, respectively. Thus, the down arrow 503 may indicate, within the adjusted text string 502, where the shortest machine translated text string would end, and the up arrow 504 may indicate, within the adjusted text string 502, where the original English text string 501 would end if it were not for the added vowels which expand the length of the adjusted text string. Other markers may also be used, such as a marker to indicate the length of the longest machine translation relative to the adjusted text string 502. Adding vowels to the text string (along with diacritic characters) may allow the adjusted text string 502 to remain readable while still expanding it according to the string length adjustment ratio 115. Keeping the adjusted text string 502 readable may be advantageous for ensuring that developers use the embodiments herein for the long term.

Other examples of expanding the original text string are illustrated in FIG. 6. For example, the same text string "The account name or password is incorrect. Please try again." (601) may be adjusted using extra consonants instead of adding extra vowels. For instance, as shown in adjusted text string 602, each consonant may have an extra consonant next to it. This may be used to expand the original text string 602 to a longer version that is more representative of longer, translated languages such as German or Greek. Accordingly, the user interface developer may be able to promptly see that a given text string is too long for a given user interface element. Or, the developer may be able to see that a given text string may be much shorter when translated and may make changes to the text string or to the user interface. Other means of adjusting the length of the text string 122 may include adding additional words into the text string or adding the words at the end of the string, adding additional characters or symbols within or at the beginning or end of the text string, changing font size, adding pictures or symbols, or adding or removing other elements to expand or contract the text string. By seeing the adjusted string size, the developer (or other user) may get an informed idea of how the string will look when formally translated into other languages.

In some cases, as noted above, text strings 122 may be adjusted (e.g., expanded) and/or modified to include diacritics or other characters on the fly. Thus, as the user enters a word or phrase, for example, that word or phrase may be dynamically changed within the user interface 120 to include additional characters or spaces, according to the calculated string length adjustment ratio 115 for that word. In some embodiments, developing user interfaces with this feature enabled may be the default setting. As such, developers or other users working on user interfaces that are likely to be translated into multiple languages may know, for each word or phrase, whether that word or phrase will fit within their designed user interface element. In some embodiments, the string adjustment calculator 114 may look at the shortest translated string length, the longest translated string length, or an intermediate string length determined by adding characters or words to the original text string, and then determining the optimal string length adjustment ratio 115 for that modified text string. In some cases, an expansion ratio may be applied to the string based on the longest translated text string. In other cases, a shorter expansion ration may be applied, depending on user preferences, depending on languages selected for translation, depending on user interface element constraints, or other factors.

After a string length adjustment ratio 115 has been calculated for the text string 122, the string adjustment module 116 may add characters to or remove characters from the text string to adjust it according to the determined ratio. In cases where the text string 122 is to be expanded, a certain number of vowels may be added, for example. In cases where adding an additional vowel for each vowel currently present in the original text string 122 is insufficient to expand the text string by the amount indicated in the calculated ratio, additional vowels, consonants, spaces or other characters may be added to match the ratio 115. Thus, depending on the calculated ratio 115, a customized set of characters may be added to the text string 122 to expand the text string such that it represents at least some of the translated text strings output by the machine translator 108.

When adding vowels, consonants or spaces, the string adjustment module 116 may implement one or more rules, algorithms or settings to ensure that the adjusted text string 117 is readable by the user 121. In some cases, adding a mixture of random characters may make the adjusted text string 117 unreadable or at least very difficult to read. By adding additional vowels or adding additional consonants, the adjusted text string 117 may remain readable by the user. This may allow the user to use the adjusted text strings 117 throughout the development process as a default process without the user feeling like he or she needs to constantly switch between the original text string 122 and the adjusted text string 117. Keeping the expanded (or contracted) text readable may make the features described herein usable by developers or other users on a daily basis.

Figure 7:
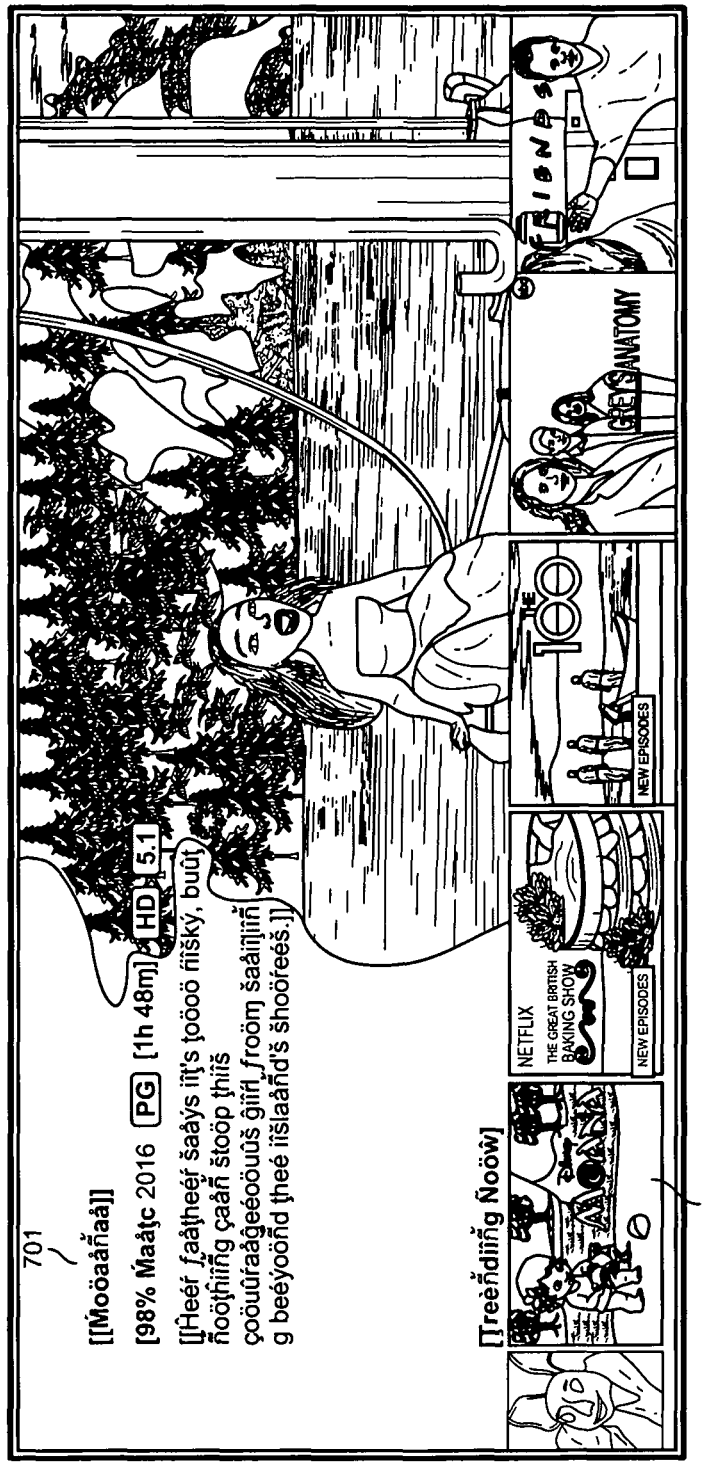
FIG. 7 illustrates an embodiment in which a customized string length adjustment ratio is applied to text in a user interface.

FIG. 7, for example, illustrates an example user interface that allows users to select a video to watch. The main video, "Moana," is shown prominently in the top portion of the picture. The text for the movie title 701, as well as accompanying description is shown in adjusted text form with multiple vowels and diacritics on many of the characters. Other pictures or logos may not be adjusted, such as the movie rating (PG), run time (1 h 48 m), video quality information (HD), surround sound information (5.1), or other user interface elements. Accordingly, a developer working on various aspects of the user interface may implement a system which performs the method 200 of FIG. 2 dynamically as the developer is working on the user interface. The developer may thus be able to easily see how the translated text would look if it took up the entire extended space indicated by the adjusted text string. The developer may thus be able to see, for each feature, whether that feature will appear properly in other languages while still viewing the text in the user's native language, albeit in an adjusted form. This dynamic text string adjustment may apply to titles and text descriptions (e.g., 701), to text that is near or overlaid on graphic elements such as 702, or to other on-screen elements.

Thus, for instance, the developer may be able to see, within a given user interface element or graphic, whether the adjusted text string 117 is clipped, or whether the adjusted text runs onto another user interface element, or whether the adjusted text covers part of an image or graphic. Regardless of which problems arise, the developer may be able to see the problems before going through the time and cost of human translation and may be able to fix the problems before even submitting the code for a build. Moreover, it should be noted that the developer may use substantially any type of electronic device or platform to develop the user interface. Indeed, the embodiments described herein may function on substantially any type of electronic device or platform, including mobile phones, game centers, televisions, or other platforms, etc.

In some embodiments, the computer system 101 of FIG. 1 may receive an input indicating a specified second language into which the accessed text string 122 is to be translated. The machine translator 108 may then translate the accessed text string 122 into the specified language using machine translation. This translated string 110 may then be presented in the specified language in the user interface 120. At this point, the translated string may not be adjusted by the string adjustment module 116; rather, the translated string may be presented in the user interface 120 directly in its machine-translated form, allowing the developer or other user to verify the user interface in the specified language. The same could be performed for many different languages, running perhaps in succession, one right after the other. Thus, if a developer wanted to check a certain specific language or set of languages to ensure that text in that language will not be clipped or overrun its boundaries, the developer can select that language or set of languages and the computer system 101 may translate and present that translated text string 110 in the user interface 120. In some cases, the computer system 101 may additionally generate an adjusted text string 117 as a replacement for the specified translated text string. As such, the developer may be able to switch between the machine-translated text string and the generated adjusted text string 117 within the user interface. Switching back and forth between these strings may give the developer an even better idea of how the specified language or set of languages will likely appear in the user interface 120.

A corresponding system for dynamically adjusting string length in a user interface according to a customized string length adjustment ratio may also be provided. The system may include the following: at least one physical processor (e.g., 102 of FIG. 1), physical memory (e.g., 103) comprising computer-executable instructions that, when executed by the physical processor, cause the physical processor to: access a string of text 122 that includes one or more characters 123 written in a first language, translate the accessed text string into one or more different languages using machine translation, identify, among the translated text strings 110, a shortest string 112 having the shortest translated string length and a longest string 113 having the longest translated string length, calculate a customized string length adjustment ratio 115 for adjusting the length of the accessed text string based on the identified shortest translated string length and the identified longest translated string length, dynamically apply the calculated customized string length adjustment ratio 115 to the accessed text string 112 to dynamically adjust the length of the accessed text string according to the customized string length adjustment ratio, and then present the adjusted text string 117 in the user interface 120.

In some embodiments, when developing a user interface, a developer or other user may provide a text string with surrounding structure provided by a markup language. For example, as shown in FIG. 8, a developer may provide an input 801 with words or phrases that are to be presented according to one or more hypertext markup language (HTML) tags. The computer system 101 may analyze the input, determine which part of the input is text that will be visible in the user interface and determine which part is markup language. The computer system 101 may then dynamically apply a calculated string adjustment ratio 115 for the words that will be visible in the user interface 120. Thus, as can be seen in the output 802, the text from the input "TV shows and movies added in the last day." is extended by adding a vowel for each vowel present in the original text string in 801. As can be further seen, text with variables may also be implemented in a user interface. The embodiments herein may be designed to ignore variables, ignore markup language text, and ignore other text that may be confusing if adjusted. As such, in FIG. 8, only the text that is visible in the user interface is expanded according to the calculated string adjustment ratio 115.

Using the embodiments herein, developers working on a user interface may be able to easily determine when a text string will work within a user interface and when it will cause issues. As illustrated in FIG. 9A, for example, a user interface 901 presented in a first language (English) may include a user interface button 903A that reads "Yes, get notifications." If the user selects that button, the user will presumably receive notifications for the selected tv series. When the user interface text is translated into a different language (e.g., German in user interface 902), the text in button 903B appears to fit properly, but the translated phrase "Lassen Sie Sich nichts ent . . . " 904A has been clipped. The developer may have the option to then make changes to the user interface to make room for the longer text string. As such, after making changes, in FIG. 9B the text string "Lassen Sie rich nichts entgehen" 904B is fully visible.

In some cases, the adjusted text may include boundary markers that are visible within the user interface. For instance, as shown in FIGS. 5-8, the adjusted text string may be surrounded by brackets (e.g., "0" or "0") or other similar boundary markers. These boundary markers may help the developer know where the adjusted text string 117 begins and ends. From these brackets, the developer may deduce whether the entire adjusted text string is visible or not. In some cases, a specified boundary marker may be implemented at the beginning and end of each adjusted text string. Once the user interface build has been compiled, an algorithm or machine learning module may take screenshots of the user interface and may scan for the specified boundary markers (e.g., brackets). In this manner, an automated system may be able to scan the user interface to automatically detect when text has been clipped if the open bracket is visible, but the closed bracket is missing. In other embodiments, the automated system may be configured to take a screenshot of the user interface in a given software build and submit the screenshot to a quality assurance user to visually inspect and validate the software build. The quality assurance user may look for boundary markers to help determine whether any text is missing for a software build of a given language.

The system may also insert intermediate markers into the adjusted text string in addition to or as an alternative to the boundary markers. The intermediate markers (e.g., 503, 504 of FIG. 5) may identify the shortest string, the longest string, the length of the original text string in the base language, or the length recommended by the customized string length adjustment ratio after performing the machine translations and comparing the translated string lengths. These intermediate markers may help the developer to know how text strings may look in other languages, or at least how long the strings might be when translated. In some cases, the customized string length adjustment ratio calculated for the text string 122 may be specific to the original language. Thus, if the developer is working in Chinese, the customized string length adjustment ratio may be specific to Chinese, and if the developer is working in Greek, German, English or some other language, the customized string length adjustment ratio may be specific to that language. Thus, the customized string length adjustment ratio may provide different results based on the original language used and the languages into which the text string is to be translated. Moreover, user interface limitations and designs may also limit how far the customized string length adjustment ratio is permitted expand a given text string. In such cases, the customized string length adjustment ratio may be reduced to comply with the user interface constraints.

In some cases, the embodiments herein (including potentially method 200 of FIG. 2) may be performed by applying a font to a text string. For example, the user 121 may access or provide text string 122 which includes one or more characters 123 written in an original language. The user may then highlight the string of text 122 and change the font of the text string to a different, customized font. The customized font may dynamically apply a calculated string length adjustment ratio to the accessed text string to adjust the text string in the manner described above. The act of applying the font may initiate each of the steps in method 200, including performing machine translation on the highlighted text, identifying translated string lengths, calculating a string length adjustment ratio, adjusting the string and then presenting the adjusted string in the new customized font. As such, this customized font may dynamically apply a calculated string length adjustment ratio and may add additional characters, spaces or other symbols to adjust the text string in the prescribed manner. Moreover, the customized font may change the characters to include diacritics to show how the text may appear in other languages. Furthermore, the user 121 may be able to type in this customized font. As each word is input and translated, the calculated adjustment ratio may be applied to the word dynamically. Accordingly, the user 121 may be able to see in real time how a given string of text looks in its adjusted form as they type it out.

A non-transitory computer-readable medium may also be provided. The non-transitory computer-readable medium may include one or more computer-executable instructions that, when executed by at least one processor of a computing device, cause the computing device to: access a string of text that includes one or more characters written in a first language, translate the accessed text string into one or more different languages using machine translation, identify, among the translated text strings, a shortest string having the shortest translated string length and a longest string having the longest translated string length, calculate a customized string length adjustment ratio for adjusting the length of the accessed text string based on the identified shortest translated string length and the identified longest translated string length, dynamically apply the calculated customized string length adjustment ratio to the accessed text string, so that the length of the accessed text string is dynamically adjusted according to the customized string length adjustment ratio and present the adjusted text string in the user interface.

Accordingly, the embodiments herein may be implemented to dynamically adjust a text string in a user interface. The adjusted text string may be expanded or contracted to represent how the text might look if it were translated into another language. This may help a user interface developer to know how to design various elements of the user interface. If the user interface elements, for example, are too small to fit a portion of text once that text has been translated, the developer can change the input text or can change the user interface to accommodate the translated text string. Thus, in this manner, a user interface developer may be able to save time and prevent wasted effort spent on user interface elements that may ultimately need to be changed (perhaps post-build) to fix a problem that could have been solved by viewing the adjusted text string in the user interface in the manner described herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

1. A computer-implemented method for adjusting string length in a user interface according to a customized string length adjustment ratio, the method comprising: accessing a string of text that includes one or more characters written in a first language; translating the accessed text string into one or more different languages using machine translation; identifying, among the translated text strings, a shortest string having the shortest translated string length and a longest string having the longest translated string length; calculating a customized string length adjustment ratio for adjusting the length of the accessed text string based on the identified shortest translated string length and the identified longest translated string length; dynamically applying the calculated customized string length adjustment ratio to the accessed text string, such that the length of the accessed text string is dynamically adjusted according to the customized string length adjustment ratio; and presenting the adjusted text string in the user interface.

2. The computer-implemented method of claim 1, wherein the customized string length adjustment ratio is calculated and applied dynamically as the string of text is input by a user.

3. The computer-implemented method of claim 1, wherein presenting the adjusted text string in the user interface further comprises: determining which characters in the accessed text string are vowels; and adding one or more additional vowels at each identified vowel in the adjusted text string.

4. The computer-implemented method of claim 3, wherein a sufficient number of additional vowels are added to the adjusted text string to expand the adjusted text string according to the customized string length adjustment ratio.

5. The computer-implemented method of claim 1, wherein presenting the adjusted text string in the user interface further comprises adding one or more additional words to the adjusted text string to expand the adjusted text string according to the customized string length adjustment ratio.

6. The computer-implemented method of claim 1, wherein presenting the adjusted text string in the user interface further comprises removing one or more words or characters from the adjusted text string to contract the adjusted text string according to the customized string length adjustment ratio.

7. The computer-implemented method of claim 1, wherein presenting the adjusted text string in the user interface further comprises adding one or more additional consonants to the adjusted text string to expand the adjusted text string according to the customized string length adjustment ratio.

8. The computer-implemented method of claim 1, further comprising: receiving an input indicating a specified second language into which the accessed text string is to be translated; translating the accessed text string into the second language using machine translation; and presenting the adjusted text string in the second language in the user interface, allowing the user interface to be verified in the second language.

9. The computer-implemented method of claim 1, wherein a user developing one or more aspects of the user interface implements the customized string length adjustment while developing the user interface.

10. The computer-implemented method of claim 1, wherein the user sees, for each user interface feature, whether that user interface feature is properly presented in a specified language.

11. The computer-implemented method of claim 1, wherein the customized string length adjustment ratio is applied dynamically as a user is providing text for one or more user interface elements.

12. A system comprising: at least one physical processor, physical memory comprising computer-executable instructions that, when executed by the physical processor, cause the physical processor to: access a string of text that includes one or more characters written in a first language; translate the accessed text string into one or more different languages using machine translation; identify, among the translated text strings, a shortest string having the shortest translated string length and a longest string having the longest translated string length; calculate a customized string length adjustment ratio for adjusting the length of the accessed text string based on the identified shortest translated string length and the identified longest translated string length; dynamically apply the calculated customized string length adjustment ratio to the accessed text string, such that the length of the accessed text string is dynamically adjusted according to the customized string length adjustment ratio; and present the adjusted text string in a user interface.

13. The system of claim 12, wherein the adjusted text string includes one or more boundary markers visible within the user interface.

14. The system of claim 13, further comprising scanning one or more user interface screenshots for the boundary markers to automatically detect clipping of the adjusted text string.

15. The system of claim 12, further comprising inserting one or more intermediate markers into the adjusted text string indicating at least one of the following: the identified shortest string, the identified longest string, the text string written in the first language, or the length recommended by the customized string length adjustment ratio.

16. The system of claim 12, wherein one or more diacritics are added to one or more characters of the adjusted text string, providing a vertical stress to the user interface.

17. The system of claim 12, further comprising: taking a screenshot of the user interface for at least one software build of the user interface; and submitting the screenshot to a quality assurance user to validate the software build.

18. The system of claim 12, wherein the customized string length adjustment ratio is specific to the target language.

19. The system of claim 12, wherein accessing the string of text that includes one or more characters written in a first language comprises highlighting the string of text and changing to a specified font, such that the font applies the customized string length adjustment ratio to the accessed text string.

20. A non-transitory computer-readable medium comprising one or more computer-executable instructions that, when executed by at least one processor of a computing device, cause the computing device to: access a string of text that includes one or more characters written in a first language; translate the accessed text string into one or more different languages using machine translation; identify, among the translated text strings, a shortest string having the shortest translated string length and a longest string having the longest translated string length; calculate a customized string length adjustment ratio for adjusting the length of the accessed text string based on the identified shortest translated string length and the identified longest translated string length; dynamically apply the calculated customized string length adjustment ratio to the accessed text string, such that the length of the accessed text string is dynamically adjusted according to the customized string length adjustment ratio; and present the adjusted text string in a user interface.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive text that is to be adjusted, transform the text, output a result of the transformation to generate a text adjustment ratio, use the result of the transformation to adjust the text, and store the result of the transformation for use in the user interface. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method comprising:
   accessing a string of text that includes one or more characters written in a first language as the string of text is input by a user;
   translating the accessed text string into two or more different languages using machine translation;
   identifying, among the translated text strings, a shortest string from a first language of the two or more different languages having the shortest translated string length and a longest string from a second language of the two or more different languages having the longest translated string length;
   calculating a customized string length adjustment ratio for adjusting the length of the accessed text string based on the identified shortest translated string length from the first language and the identified longest translated string length from the second language;
   dynamically applying the calculated customized string length adjustment ratio to the accessed text string as the text string is input by the user, such that the length of the accessed text string is dynamically adjusted within the user interface as the characters of the text string are accessed and translated into the at least two different languages according to the customized string length adjustment ratio; and
   presenting the adjusted text string in the user interface.

2. The computer-implemented method of claim 1, wherein the customized string length adjustment ratio is calculated and applied dynamically as the string of text is input by a user.

3. The computer-implemented method of claim 1, wherein presenting the adjusted text string in the user interface further comprises:
   determining which characters in the accessed text string are vowels; and
   adding one or more additional vowels at each identified vowel in the adjusted text string.

4. The computer-implemented method of claim 3, wherein a sufficient number of additional vowels are added to the adjusted text string to expand the adjusted text string according to the customized string length adjustment ratio.

5. The computer-implemented method of claim 1, wherein presenting the adjusted text string in the user interface further comprises adding one or more additional words to the adjusted text string to expand the adjusted text string according to the customized string length adjustment ratio.

6. The computer-implemented method of claim 1, wherein presenting the adjusted text string in the user interface further comprises removing one or more words or characters from the adjusted text string to contract the adjusted text string according to the customized string length adjustment ratio.

7. The computer-implemented method of claim 1, wherein presenting the adjusted text string in the user interface further comprises adding one or more additional consonants to the adjusted text string to expand the adjusted text string according to the customized string length adjustment ratio.

8. The computer-implemented method of claim 1, further comprising:
   receiving an input indicating a specified second language into which the accessed text string is to be translated;
   translating the accessed text string into the second language using machine translation; and
   presenting the adjusted text string in the second language in the user interface, allowing the user interface to be verified in the second language.

9. The computer-implemented method of claim 1, wherein a user developing one or more aspects of the user interface implements the customized string length adjustment while developing the user interface.

10. The computer-implemented method of claim 1, wherein the user sees, for each user interface feature, whether that user interface feature is properly presented in a specified language.

11. The computer-implemented method of claim 1, wherein the customized string length adjustment ratio is applied dynamically as a user is providing text for one or more user interface elements.

12. A system comprising:

at least one physical processor;

physical memory comprising computer-executable instructions that, when executed by the physical processor, cause the physical processor to:

access a string of text that includes one or more characters written in a first language as the string of text is input by a user;

translate the accessed text string into two or more different languages using machine translation;

identify, among the translated text strings, a shortest string from a first language of the two or more different languages having the shortest translated string length and a longest string from a second language of the two or more different languages having the longest translated string length;

calculate a customized string length adjustment ratio for adjusting the length of the accessed text string based on the identified shortest translated string length from the first language and the identified longest translated string length from the second language;

dynamically apply the calculated customized string length adjustment ratio to the accessed text string as the text string is input by the user, such that the length of the accessed text string is dynamically adjusted within the user interface as the characters of the text string are accessed and translated into the at least two different languages according to the customized string length adjustment ratio; and present the adjusted text string in a user interface.

13. The system of claim 12, wherein the adjusted text string includes one or more boundary markers visible within the user interface.

14. The system of claim 13, further comprising scanning one or more user interface screenshots for the boundary markers to automatically detect clipping of the adjusted text string.

15. The system of claim 12, further comprising inserting one or more intermediate markers into the adjusted text string indicating at least one of the following: the identified shortest string, the identified longest string, the text string written in the first language, or the length recommended by the customized string length adjustment ratio.

16. The system of claim 12, wherein one or more diacritics are added to one or more characters of the adjusted text string, providing a vertical stress to the user interface.

17. The system of claim 12, further comprising:

taking a screenshot of the user interface for at least one software build of the user interface; and submitting the screenshot to a quality assurance user to validate the software build.

18. The system of claim 12, wherein the customized string length adjustment ratio is specific to the target language.

19. The system of claim 12, wherein accessing the string of text that includes one or more characters written in a first language comprises highlighting the string of text and changing to a specified font, such that the font applies the customized string length adjustment ratio to the accessed text string.

20. A non-transitory computer-readable medium comprising one or more computer-executable instructions that, when executed by at least one processor of a computing device, cause the computing device to:

access a string of text that includes one or more characters written in a first language as the string of text is input by a user;

translate the accessed text string into two or more different languages using machine translation;

identify, among the translated text strings, a shortest string from a first language of the two or more different languages having the shortest translated string length and a longest string from a second language of the two or more different languages having the longest translated string length;

calculate a customized string length adjustment ratio for adjusting the length of the accessed text string based on the identified shortest translated string length from the first language and the identified longest translated string length from the second language;

dynamically apply the calculated customized string length adjustment ratio to the accessed text string as the text string is input by the user, such that the length of the accessed text string is dynamically adjusted within the user interface as the characters of the text string are accessed and translated into the at least two different languages according to the customized string length adjustment ratio; and present the adjusted text string in a user interface.

* * * * *